July 5, 1938.                S. DOWINSKY                2,123,002
                              PRESSING IRON
                    Filed Jan. 19, 1937        2 Sheets-Sheet 2
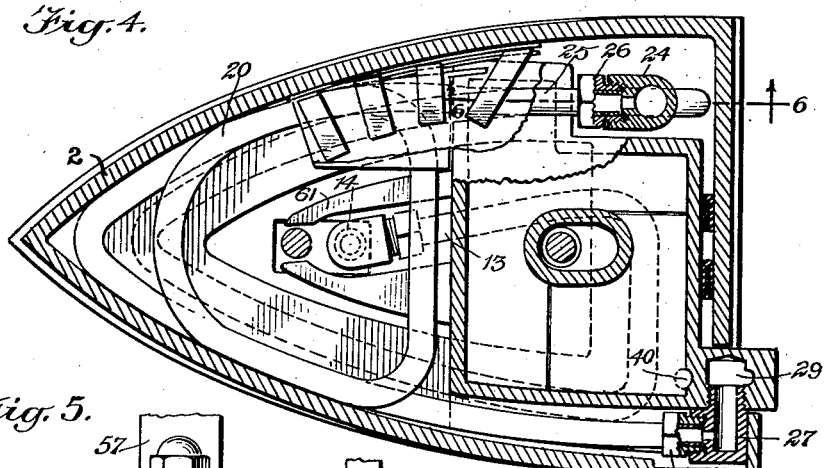
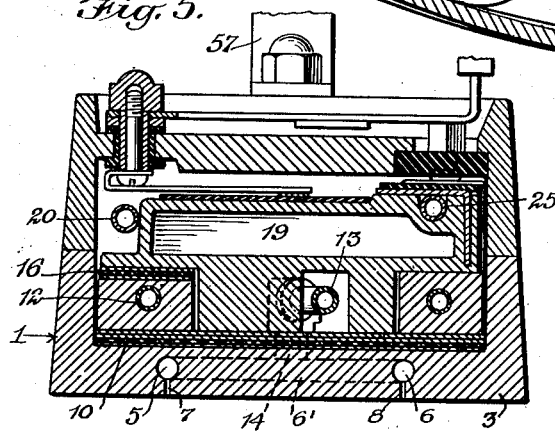
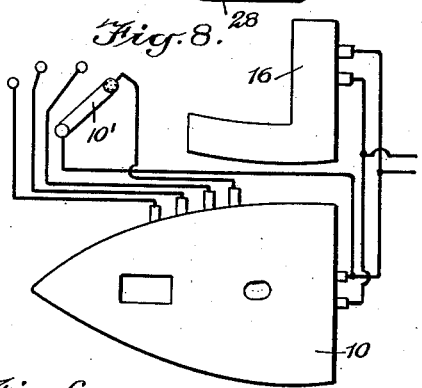
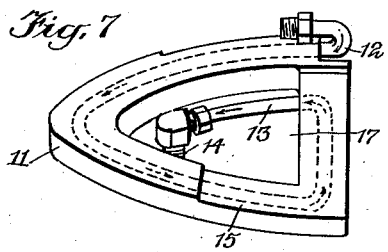
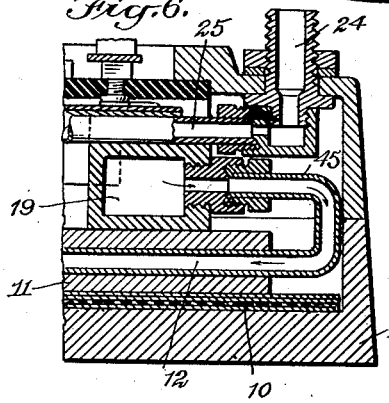
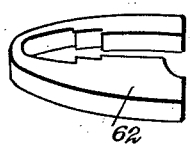
WITNESSES                                    INVENTOR
                                          Samuel Dowinsky
                                                BY
                                                    ATTORNEYS Patented July 5, 1938

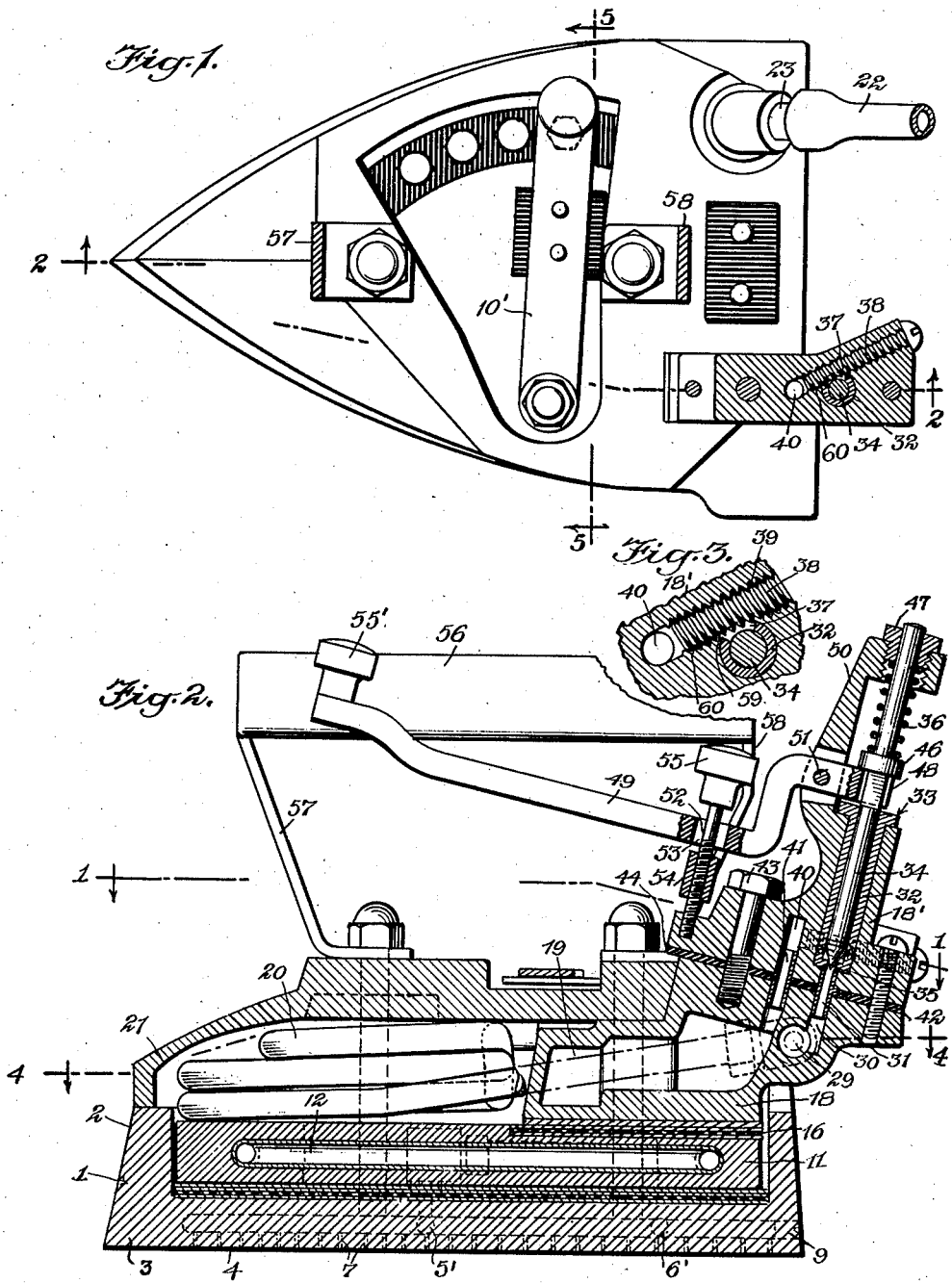

2,123,002

UNITED STATES PATENT OFFICE 2,123,002

PRESSING IRON

Samuel Dowinsky, New York, N. Y.

Application January 19, 1937, Serial No. 121,277

3 Claims. (Cl. 38—77)

This invention relates to pressing irons, and particularly to an improved iron which is adapted to supply superheated steam to the articles being pressed, the object being to provide a construction which is easily manipulated and which may be easily regulated to supply steam at the desired temperature and the desired amount.

Another object is to provide a pressing iron wherein there is presented a primary heating coil, a steam generating chamber, and a superheating structure for raising the steam to a desired temperature.

An additional object is to provide a pressing iron adapted to be used in the usual capacity of a pressing iron and, in addition, as means for supplying superheated steam to the articles being pressed, the structure being such that a hand operated valve is arranged to regulate the passage of water to a steam generating chamber.

An additional and further object is to provide a pressing iron including a plurality of heating elements arranged to coact with steam generating and superheating members positioned so that steam may be produced in one of the members and superheated in the other of the members.

In the accompanying drawings:

Fig. 1 is a sectional view through Fig. 2 approximately on the line 1—1 and showing an embodiment of the invention with certain parts broken away;

Fig. 2 is a sectional view through Fig. 1 approximately on the line 2—2, with certain parts shown in elevation;

Fig. 3 is an enlarged fragmentary sectional view of part of the valve and water feeding structure;

Fig. 4 is a sectional view through Fig. 2 approximately on the line 4—4;

Fig. 5 is a transverse sectional view through Fig. 1 approximately on the line 5—5;

Fig. 6 is a fragmentary sectional view through Fig. 4 approximately on the line 6—6;

Fig. 7 is a perspective view on a reduced scale of a superheating plate;

Fig. 8 is a view principally in diagram illustrating the two heating elements and the electrical connection therefor; and Fig. 9 is a fragmentary perspective view showing a slight modified form of plate to that illustrated in Fig. 7.

Referring to the accompanying drawings by numerals, 1 indicates a body having a peripheral upstanding wall 2 and a bottom 3. All the members just described are preferably formed as a casting with the lower surface 4 made smooth as is usual in pressing irons. The bottom 3, as shown in Fig. 5, is provided with a pair of steam passageways 5 and 6 which have suitable vents 7. The passageways 5 and 6 preferably extend from one end of the bottom 3 to near the other end. Suitable plugs 9 are arranged in one end of each of the passageways 5 and 6 so as to seal the passageways at these points.

Arranged on the upper surface of the bottom 3 within the wall 2 is a main or primary electric heater 10, and on top of this heater is arranged a superheater plate 11 which is a casting in which a pipe 12 is embedded. It will be noted that the material of plate 11 is cast about and in intimate contact with the tube 12, but this tube as shown in Fig. 7 projects from the plate at each end. The end 13 of tube 12 is connected with a pipe or tube 14 which is secured by threads or otherwise to the bottom 3 with the parts so formed that the interior of the pipe 14 will be in free communication with the passageways 5 and 6. Preferably the passageways 5 and 6 are connected by cross passageways 5' and 6'.

In forming the plate 11 it will be observed that there is provided an offset section 15, and in this offset section or portion there is provided an auxiliary heating element 16. On top of the element 16 and extending over part of the space 17 is a member 18 (preferably a casting) forming a steam generating chamber 19. This chamber is distinguished from a pipe or coil by having an open space which, as shown in Fig. 4, is substantially square though it could be of some other shape without departing from the spirit of the invention. This chamber is therefore many times wider and longer than the inlet or outlet thereof. As hereinafter described, water is fed into this chamber in small batches so that the water is instantly turned into steam and this steam is directed to the pressing surface after it has passed through a heater. In front of the member 18 there is provided a coil of pipe 20 which acts as a water heating coil and rests on the casting or superheater plate 11. A casing of metal 21 rests on the metal body 1 so as to enclose coil 20 and most of the member 18.

Any suitable flexible or other supply pipe 22 (Fig. 1) is connected with a pipe 23 which extends into the fitting 24 (Fig. 4), which is connected to the end 25 of the coil 20 by a suitable fitting 26. In this way the coil 20 is continually supplied with water under some pressure. The end of the coil 20 opposite end 25 is connected to a tubular member 27 through the fitting 28 as shown in Fig. 4. The tubular member 27 (Fig. 4) discharges into the chamber 29 (Figs. 2 and 4)

formed in the member 18. Chamber 29 is in free communication with the passageway 30 which discharges into a pipe 31, and this pipe in turn discharges into the casing 32 of the valve structure 33. Valve structure 33 has a needle valve member 34 slidably mounted in member 32 and normally pressing against the seat 35 by reason of the action of spring 36.

An opening 37 (Fig. 3) is formed in the casing 32. A screw member 38 rather loosely fits into a threaded bore 39 and passes the opening 37. In this way a valve formation is presented which will limit the flow of water from the casing 32 to the bore or passageway 40. As shown in Fig. 2, the passageway 40 has a short pipe 41 so that none of the water may leak out at the joint 42. It will be noted that the casting 18 is connected with the casting 18' by suitable bolts 43 and that there is provided a heat insulation member 44 at the division 42.

Water passing through the threaded bore 39 will enter the passageway 40 and then pass into the steam generating chamber 19 where it is turned into steam at a comparatively low pressure. From the chamber 19 the steam is adapted to pass into the pipe 12 through the end portion 45 as shown in Fig. 6. This steam passing through pipe 12 will eventually be discharged out through the pipe 14 as shown in Fig. 7. As the steam passes through the pipe 12 it becomes superheated and consequently is very hot when it enters the respective passageways 5 and 6.

In view of the structure just described it will be seen that cold water entering coil 20 will be heated to a certain extent and then admitted in small batches into chamber 19 where it is turned into steam at a comparatively low temperature and then converted into superheated steam before it is discharged out the various jets 7 and 8.

The needle valve 34 is mounted to reciprocate and is provided with a shoulder 46 against which spring 36 presses. This spring also presses against the screw abutment 47 as shown in Fig. 2. The bifurcated end 48 of lever 49 straddles the needle valve 34 immediately below the abutment 46. It will be observed that the casting 18' is provided with an arm 50 which carries the screw member 47 and also carries a pivotal pin 51 on which the lever 49 is pivotally mounted. Lever 49 is provided with a comparatively large aperture 52 through which the screw 53 extends. This screw is screwed tightly into the casting 18' and is provided with an adjustable nut 54 and with a head 55. By adjusting the nut 54 the downward movement of lever 49 is limited.

The outer end of lever 49 is provided with a thumb member 55' which is arranged near the handle 56. Handle 56 may be made from wood or other material and is connected through suitable metal members 57 and 58 to the casing 21. When the iron is in use the handle 56 is grasped and the iron is moved over the article being pressed. Whenever steam is desired, the operator merely pushes downwardly on the knob 55' and this will raise the needle valve 34 so that a certain amount of heated water will pass into the chamber 19. The amount of water passing into chamber 19 is determined by the length of time that the valve is open and also the amount of opening. In this connection, however, it will be seen that the valve screw 38 shown in Fig. 3 prevents large quantities of water to be suddenly discharged into the chamber 19. The amount of water passing per unit time from opening 37 to passageway 40 is really determined by the number of threads of screw 38 that occupies the space between points 59 and 60.

As shown in the drawings in Fig. 3, the least amount of water possible as far as valve 38 is concerned is permitted to pass. By unscrewing the valve 38 somewhat so that there will be a less number of turns of threads between points 59 and 60, a greater amount of water will be permitted to pass. This regulation is in addition to the regulation of the amount of opening of needle valve 34.

The heating elements 10 and 16 are connected with suitable wiring as shown in Fig. 8 so that the heating unit 16 will receive the full pressure of the electricity at all times, but the heating unit 10 may have the current supplied thereto varied by the switch 10'. The switch 10' and associated parts are formed so that when the switch arm is in the position shown in Figs. 1 and 8 the smallest amount of current is being supplied to element 10 and more and more current is supplied as the switch arm is moved over to the last contact point.

Referring to Figs. 4 and 5, it will be seen that casting 18 is provided with an integral extension 61 adapted to partly fill the space 17 in member 11. This extension also acts as a support for part of coil 20. As shown in Fig. 9, the member 62 is made separate from casting 18 and functions substantially like extension 61.

I claim:

1. In a pressing iron having a bottom provided with a steam passageway having a plurality of outlets for directing steam to the bottom surface of said bottom, a water heating coil, means in communication with one end of said coil presenting a steam generating chamber, and means for superheating steam from said chamber, said last mentioned means including a second coil and a heating casting cast about and in intimate contact therewith, one end of said second coil being open to said chamber and the opposite end serving to deliver superheated steam to the steam passageway in said bottom.

2. In a pressing iron having a bottom provided with a steam passageway having a plurality of outlets for directing steam to the bottom surface of said bottom, a water heating coil, means connected to one end of said water heating coil forming a steam generating chamber, a heater for said means, means for regulating water passing from said coil to said chamber, a pipe in communication with said chamber, a mass of metal cast about and in intimate contact with said pipe forming a solid body having a passage therethrough, the opposite ends of said pipe projecting from said body with one of said ends being in full communication with said chamber for the reception of steam, and the other end projecting from said opening and serving for the delivery of superheated steam to the steam passageway in said bottom and a second heater for heating said body including said bottom and said pipe so that the steam passing from said pipe will be superheated.

3. In a pressing iron, a hollow body open at the top, a casing positioned on top of said body, said body having a bottom formed with a pressing surface, a plurality of steam passageways and vents extending from each of said passageways to the pressing surface of said bottom, an electric heating element resting on the top surface of said bottom, a superheating plate resting on top of said heating element beneath said casing, said superheating plate at one end being partly cut away, a hollow casting positioned in said partly cut away portion presenting a steam generating chamber, a pipe embedded in said superheating plate having the ends protruding therefrom, means for connecting one end of said pipe with said chamber, means connecting the other end of said pipe with said passageways, an auxiliary heating element resting on one end portion of said superheating plate beneath said hollow casting, a water heating coil positioned above said superheating plate and within said casing, means for directing water into said water heating coil at one end, means for guiding heated water from the opposite end of said coil to said chamber, and a valve for controlling the passage of heated water to said chamber.

SAMUEL DOWINSKY.